United States Patent
Tsirkin

(10) Patent No.: US 12,346,745 B2
(45) Date of Patent: Jul. 1, 2025

(54) SAFE CRITICAL SECTION OPERATIONS FOR VIRTUAL MACHINES WITH VIRTUAL CENTRAL PROCESSING UNIT OVERCOMMIT

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

(*) Notice: Subject to any disclaimer, the term of this patent is extended or adjusted under 35 U.S.C. 154(b) by 761 days.

(21) Appl. No.: 17/586,226

(22) Filed: Jan. 27, 2022

(65) Prior Publication Data

US 2023/0236901 A1  Jul. 27, 2023

(51) Int. Cl.
G06F 9/50 (2006.01)
G06F 9/30 (2018.01)

(52) U.S. Cl.
CPC ........ *G06F 9/5077* (2013.01); *G06F 9/30189* (2013.01); *G06F 9/5016* (2013.01); *G06F 9/5038* (2013.01); *G06F 9/5044* (2013.01)

(58) Field of Classification Search
CPC .. G06F 9/5077; G06F 9/30189; G06F 9/5016; G06F 9/5038; G06F 9/5044; G06F 2009/45575; G06F 2009/45583; G06F 9/45558; G06F 9/4881; G06F 9/5088; G06F 2209/5012
See application file for complete search history.

(56) References Cited

U.S. PATENT DOCUMENTS

| | | |
|---|---|---|
| 7,831,818 B2 | 11/2010 | Moyer |
| 9,256,476 B2 * | 2/2016 | McKenney ............. G06F 9/522 |
| 9,436,495 B2 * | 9/2016 | Tsirkin ................. G06F 9/45558 |
| 10,073,711 B2 | 9/2018 | Zheng et al. |
| 10,248,451 B2 * | 4/2019 | Tsirkin ................. G06F 9/45558 |
| 10,310,887 B2 | 6/2019 | Tsirkin et al. |
| 10,599,468 B2 * | 3/2020 | van Riel .................. G06F 9/52 |
| 10,691,495 B2 | 6/2020 | Lu et al. |

(Continued)

FOREIGN PATENT DOCUMENTS

WO    2011072423 A1    6/2011

OTHER PUBLICATIONS

Gabriel Southern, Analysis of SMP VM CPU Scheduling.

(Continued)

*Primary Examiner* — Douglas M Slachta
(74) *Attorney, Agent, or Firm* — Kilpatrick Townsend & Stockton LLP

(57) ABSTRACT

Safe critical section operations for virtual machines with virtual central processing unit overcommit are provided by: in response to identifying a preempting task to run on a first physical central processing unit (PCPU) from a second PCPU, setting a status of a flag in a virtual memory used by a first virtual central processing unit (VCPU) running on the first PCPU to indicate that the preempting task will interrupt the first VCPU; in response to initiating execution of a read-side critical section operation scheduled by the first VCPU to run on the first PCPU, checking the status of the flag in the virtual memory; and in response to the status of the flag being positive: exiting the first VCPU to a hypervisor; executing, by the hypervisor, the preempting task on the first PCPU; and after completing the preempting task, continuing execution of the read-side critical section operation.

20 Claims, 5 Drawing Sheets

(56) References Cited

U.S. PATENT DOCUMENTS

| | | |
|---|---|---|
| 10,929,164 B2* | 2/2021 | Tsirkin ................ G06F 11/3037 |
| 10,949,243 B2 | 3/2021 | Tsirkin |
| 11,086,655 B2* | 8/2021 | Kokkonen ............ G06F 9/4812 |
| 11,126,474 B1 | 9/2021 | Zidenberg et al. |
| 2009/0006403 A1* | 1/2009 | McKenney ............... G06F 9/52 |
| 2009/0157936 A1 | 6/2009 | Goss et al. |
| 2011/0119667 A1* | 5/2011 | Srinivasan .......... G06F 11/3055 |
| | | 718/1 |
| 2013/0174148 A1 | 7/2013 | Amit et al. |
| 2016/0077848 A1* | 3/2016 | Tu ....................... G06F 9/45558 |
| | | 718/1 |
| 2018/0203743 A1* | 7/2018 | Myerscough ............. G06F 9/52 |
| 2019/0324801 A1* | 10/2019 | Kaveri .................... G06F 9/485 |
| 2020/0264995 A1 | 8/2020 | Raisch et al. |
| 2021/0216344 A1 | 7/2021 | Tsirkin |
| 2022/0027191 A1* | 1/2022 | Hay ....................... G06F 9/4818 |
| 2022/0405121 A1* | 12/2022 | Shan ........................ G06F 9/545 |

OTHER PUBLICATIONS

Bei Wang, et al., Efficient Consolidation-aware VCPU scheduling on Multicore Virtualization Platform.

U.S. Appl. No. 17/702,090, Non-Final Office Action, Dec. 19, 2024, 19 pages.

* cited by examiner

SAFE CRITICAL SECTION OPERATIONS FOR VIRTUAL MACHINES WITH VIRTUAL CENTRAL PROCESSING UNIT OVERCOMMIT

BACKGROUND

Virtualization allows a physical computing device to share computing resources among several users via Virtual Machines (VMs) running on the host hardware. Virtualization allows for greater system flexibility, and fuller usage of the underlying hardware as several VMs can schedule usage of the underlying hardware to account for dips and spikes in individual use rates.

Virtualization and scheduling may be achieved by running a layer, often referred to as "hypervisor," above the hardware and below the VMs. A hypervisor may run directly on the server hardware without an operating system beneath it or as an application running under a traditional operating system. A hypervisor may represent the physical layer and provide interfaces between the underlying hardware and virtual devices of VMs via this representation. As the VMs may make use of the underlying hardware of the host machines, the VMs may use one or more Virtual Central Processing Units (VCPU or vCPU) assigned to one or more physical central processing units (PCPU or pCPU) with one or more cores that other VMs and system operations are also executed on. In some virtualization environments, the hypervisor represents a greater number of PCPUs to the collective VMs than the host system can provide at one time, which may be referred to as overcommit. Overcommit allows the VMs to use a greater percentage of system resources during certain computing operations when the other VMs are not scheduled to use those resources.

SUMMARY

The present disclosure provides new and innovative protections for critical read section operations, such as Read Copy Update (RCU) operations, in environments that offer Virtual Machines (VMs) with Virtual Central Processing Unit (VCPU) overcommit that result in improvements to in computing efficiency, easier synchronization among several VCPUs, and other benefits. In one example, a method is provided that comprises: in response to identifying a preempting task to run on a first physical central processing unit (PCPU) from a second PCPU, setting a status of a flag in a virtual memory used by a first virtual central processing unit (VCPU) running on the first PCPU to indicate that the preempting task will interrupt the first VCPU; in response to initiating execution of a read-side critical section operation scheduled by the first VCPU to run on the first PCPU, checking the status of the flag in the virtual memory; and in response to the status of the flag being positive: exiting the first VCPU to a hypervisor; executing, by the hypervisor, the preempting task on the first PCPU; and after completing the preempting task, continuing execution of the read-side critical section operation.

In one example, a system is provided that comprises: a processor; and a memory including instructions that when executed by the processor perform operations comprising: in response to identifying a preempting task to run on a first physical central processing unit (PCPU) from a second PCPU, setting a status of a flag in a virtual memory used by a first virtual central processing unit (VCPU) running on the first PCPU to indicate that the preempting task will interrupt the first VCPU; in response to initiating execution of a read-side critical section operation scheduled by the first VCPU to run on the first PCPU, checking the status of the flag in the virtual memory; and in response to the status of the flag being positive: exiting the first VCPU to a hypervisor; executing, by the hypervisor, the preempting task on the first PCPU; and after completing the preempting task, continuing execution of the read-side critical section operation.

In one example, a memory device is provided that includes instructions that when executed by a processor perform operations comprising: in response to identifying a preempting task to run on a first physical central processing unit (PCPU) from a second PCPU, setting a status of a flag in a virtual memory used by a first virtual central processing unit (VCPU) running on the first PCPU to indicate that the preempting task will interrupt the first VCPU; in response to initiating execution of a read-side critical section operation scheduled by the first VCPU to run on the first PCPU, checking the status of the flag in the virtual memory; and in response to the status of the flag being positive: exiting the first VCPU to a hypervisor; executing, by the hypervisor, the preempting task on the first PCPU; and after completing the preempting task, continuing execution of the read-side critical section operation.

Additional features and advantages of the disclosed methods, devices, and/or systems are described in, and will be apparent from, the following Detailed Description and the Figures.

DETAILED DESCRIPTION

Figure 1:
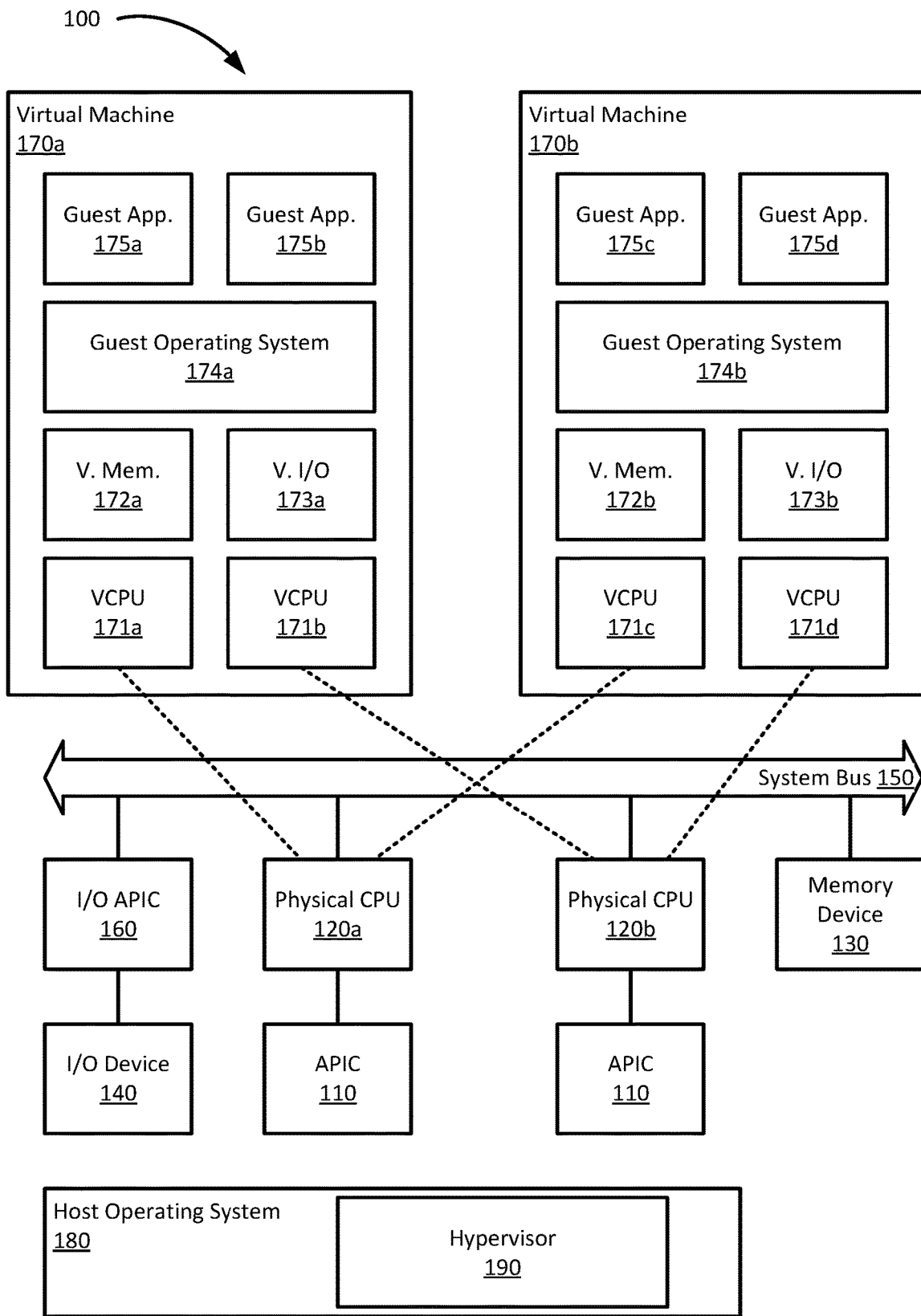
FIG. 1 illustrates a high-level component diagram of a computer system, according to examples of the present disclosure.

In a virtualization environment, overcommit allows one or more Virtual Machines (VMs) to have more Virtual Central Processing Units (VCPUs or vCPUs) than the underlying Physical Central Processing Units (PCPUs or pCPUs), or cores thereof, on the associated host machine. As the PCPUs may not be used to full capacity, the overcommit may be unnoticeable, or result in moderately slowed performance as a hypervisor in the virtualization environment adjusts which VCPU's processes are performed by the underlying PCPUs. However, many virtualization environments allow for multicore processing and operations on one core can affect when events on another core can take place, potentially leaving a VCPU "spinning" or waiting for an event from another VCPU to complete before proceeding.

When a hypervisor or other operation de-schedules a first VCPU from operating on a first PCPU, various operations that use multiple synchronized processors may be affected with arbitrarily long wait times until the first VCPU is scheduled again.

For example, VMs may be synchronized to shared memory resources via a read-copy-update (RCU) mechanism. RCU operations allow reads to occur concurrently with updates in a shared memory rather than forcing mutually exclusive access to the memory among competing threads. When a linked structure is updated according to the RCU mechanism, a thread or process in the PCPU creates a new data structure, copies the data from the initial data structure into the new data structure (with a pointer saved to the old structure), modifies the contents of the new data structure, updates a global pointer to refer to the new data structure rather than the initial data structure, and when no other threads or processes (from various PCPUs) are accessing the initial data structure, the kernel or hypervisor awakens the new data structure for general usage, and deallocates the initial data structure from the shared memory. Stated differently, RCU readers execute within read-side critical sections, and the RCU operation ensures that the readers are provided with coherent access to the underlying data by maintaining multiple versions of the data until all pre-existing read-side critical sections are completed. However, if a thread or process is interrupted during the read-side critical section, the RCU mechanism may take until the interrupted thread or process is rescheduled to complete; wasting computing resources to extend the grace period to maintain updated and original copies of the referenced data structure while waiting for the interrupted tasks to be rescheduled.

The present disclosure therefore provides techniques to avoid synchronization issues in a virtualization environment in which overcommit is permitted, thereby solving a computer-centric problem and improving the efficiency of the underlying computing devices. When overcommit occurs due to a first VCPU running on a first PCPU scheduling a thread or process to run on a second PCPU, one of the PCPUs sets a flag in guest memory accessible by the various VMs running on the associated PCPUs. The flag, when set to a positive status, indicates that one PCPU has scheduled a task to run on the other PCPU that will preempt or interrupt tasks running on the other PCPU (e.g., tasks from the first VCPU). Accordingly, a second VCPU running on the second PCPU can check this flag when entering an RCU read side critical section, and exit to the hypervisor (e.g., via hypercall) to allow the hypervisor to fully execute the preempting task before allowing the second VCPU to proceed with the read-side critical section operation.

By alerting VMs running on an overcommitted PCPU that preemption or interrupts from another PCPU are imminent, the present disclosure can reschedule operations that rely on synchronization across multiple cores to complete, such as RCU, to be performed after the preempting operation. By modifying the initial functions that start the operations that may be affected to check for this alert, the present disclosure allows for fewer computing resources to be used in the virtualization environment (e.g., for spinning VMs to wait for other processes to complete).

Although the examples given in the present disclosure are primarily given in relation to RCU operations, other operations that use publish-subscribe mechanisms that wait for a grace period for readers to complete pre-existing read operations before completing their operations (and releasing memory resources) may also benefit from the present disclosure.

FIG. 1 illustrates a high-level component diagram of a computer system 100, according to examples of the present disclosure. The computer system 100 may include one or more physical central processing units (PCPUs) 120a-b (generally or collectively, processors or PCPUs 120) communicatively coupled to memory devices 130, and input/output (I/O) devices 140 via a system bus 150.

In various examples, the PCPUs 120 may include various devices that are capable of executing instructions encoding arithmetic, logical, or I/O operations. In an illustrative example, a PCPU 120 may follow Von Neumann architectural model and may include an arithmetic logic unit (ALU), a control unit, and a plurality of registers. In another aspect, a PCPU 120 may be a single core processor which is capable of executing one instruction at a time (or process a single pipeline of instructions), or a multi-core processor which may simultaneously execute multiple instructions. In another aspect, a PCPU 120 may be implemented as a single integrated circuit, two or more integrated circuits, or may be a component of a multi-chip module (e.g., in which individual microprocessor dies are included in a single integrated circuit package and hence share a single socket).

In various examples, the memory devices 130 include volatile or non-volatile memory devices, such as RAM, ROM, EEPROM, or any other devices capable of storing data. In various examples, the memory devices 130 may include on-chip memory for one or more of the PCPUs 120.

In various examples, the I/O devices 140 include devices providing an interface between a PCPU 120 and an external device capable of inputting and/or outputting binary data.

The computer system 100 may further comprise one or more Advanced Programmable Interrupt Controllers (APIC), including one local APIC 110 per PCPU 120 and one or more I/O APICs 160. The local APICs 110 may receive interrupts from local sources (including timer interrupts, internal error interrupts, performance monitoring counter interrupts, thermal sensor interrupts, and I/O devices 140 connected to the local interrupt pins of the PCPU 120 either directly or via an external interrupt controller) and externally connected I/O devices 140 (i.e., I/O devices connected to an I/O APIC 160), as well as inter-processor interrupts (IPIs).

In a virtualization environment, the computer system 100 may be a host system that runs one or more virtual machines (VMs) 170a-b (generally or collectively, VM 170), by executing a hypervisor 190, often referred to as "virtual machine manager," above the hardware and below the VMs 170, as schematically illustrated by FIG. 1. In one illustrative example, the hypervisor 190 may be a component of a host operating system 180 executed by the host computer system 100. Additionally or alternatively, the hypervisor 190 may be provided by an application running under the host operating system 180, or may run directly on the host computer system 100 without an operating system beneath it. The hypervisor 190 may represent the physical layer, including PCPUs 120, memory devices 130, and I/O devices 140, and present this representation to the VMs 170 as virtual devices.

Each VM 170a-b may execute a guest operating system (OS) 174a-b (generally or collectively, guest OS 174) which may use underlying VCPUs 171a-d (generally or collectively, VCPU 171), virtual memory 172a-b (generally or collectively, virtual memory 172), and virtual I/O devices 173a-b (generally or collectively, virtual I/O devices 173). A number of VCPUs 171 from different VMs 170 may be mapped to one PCPU 120 when overcommit is permitted in the virtualization environment. Additionally, each VM 170a-b may run one or more guest applications 175a-d (generally or collectively, guest applications 175) under the associated guest OS 174. The guest operating system 174 and guest applications 175 are collectively referred to herein as "guest software" for the corresponding VM 170.

In certain examples, processor virtualization may be implemented by the hypervisor 190 scheduling time slots on one or more PCPUs 120 for the various VCPUs 171a-d. In an illustrative example, the hypervisor 190 implements the first VCPU 171a as a first processing thread scheduled to run on the first PCPU 120a, and implements the second VCPU 171b as a second processing thread scheduled to run on the first PCPU 120a and the second PCPU 120b.

Device virtualization may be implemented by intercepting virtual machine memory read/write and/or input/output (I/O) operations with respect to certain memory and/or I/O port ranges, and by routing hardware interrupts to a VM 170 associated with the corresponding virtual device. Memory virtualization may be implemented by a paging mechanism allocating the host RAM to virtual machine memory pages and swapping the memory pages to a backing storage when necessary.

Figure 2:
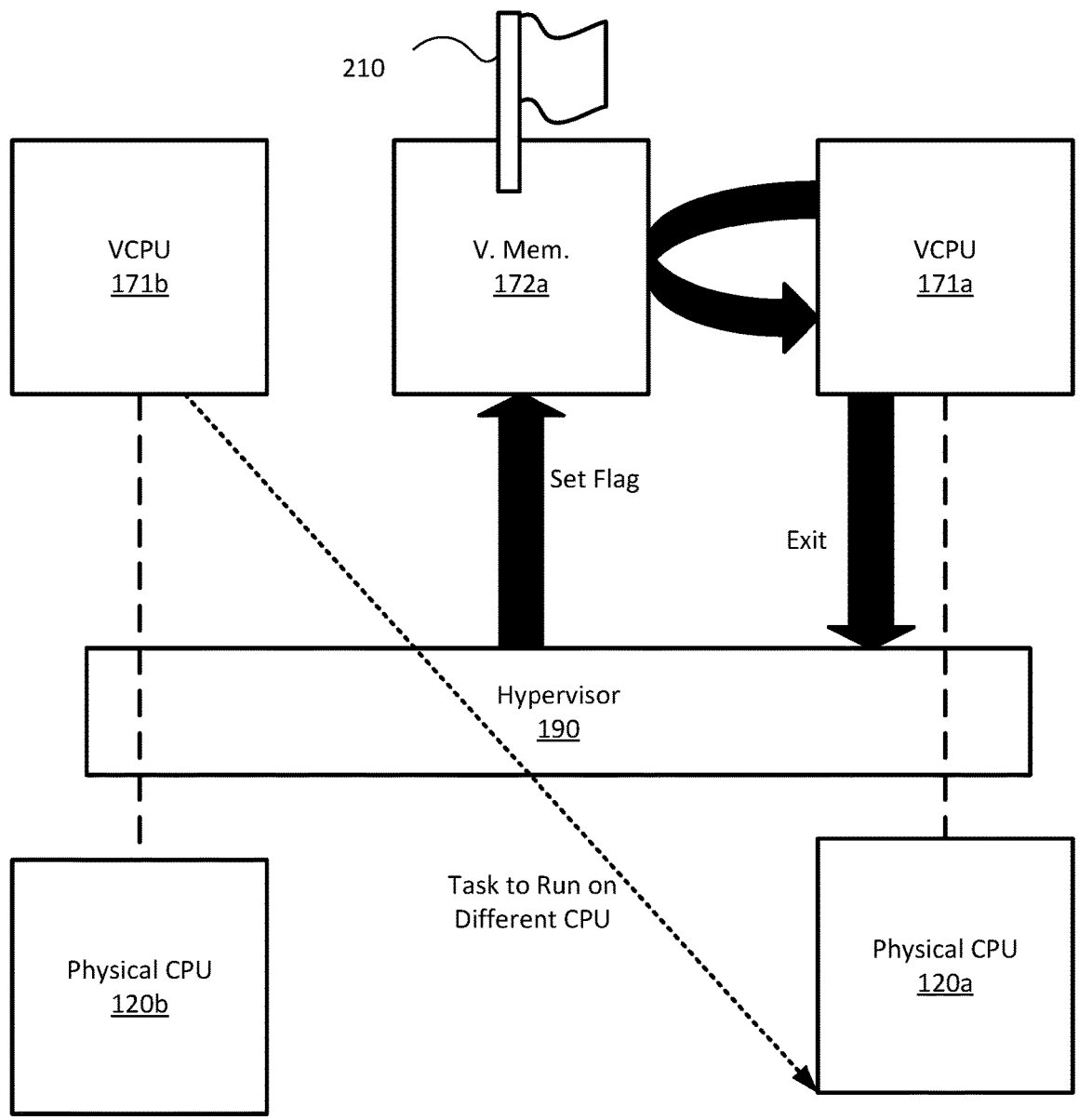
FIG. 2 is an operational flow for handling operations in a read-side critical section, according to examples of the present disclosure.

FIG. 2 is an operational flow for handling operations in a read-side critical section, according to examples of the present disclosure. As shown, the hypervisor 190 identifies a task originating from a second VCPU 171b to run on a first PCPU 120a that a first VCPU 171a is running tasks on. In various examples, the task to run on the first PCPU 120a may originate from a second VCPU 171b that is part of the same VM 170 as the first VCPU 171a, while in other examples the task may originate from a VCPU 171 from a different VM 170, or as a system task (e.g., from the host OS 180). Additionally, although the examples provided herein reference one hypervisor 190, in various examples more than one hypervisor 190 may operate in the host computing environment to manage various VMs 170.

When the hypervisor 190 identifies that the task scheduled for the first PCPU 120a is a preempting task that may interrupt or otherwise jump in queue to be performed ahead of or during any already scheduled tasks on the first PCPU 120a scheduled by the first VCPU 171a, the hypervisor 190 sets a status for a flag 210 in the virtual memory 172a used by the first VCPU 171a (and optionally used by the second VCPU 171b from which the preempting task originates from).

Accordingly, before the first VCPU 171a initiates execution of read-side critical section operations, or any read operation that may address the same data structure as a publish-subscribe mechanism task (e.g., RCU), the first VCPU 171a checks the status of the flag 210 in the virtual memory 172a. In various examples, the check is added to the a read lock function (e.g., RCU_read_lock( ) function that allows a writer thread to read the data structure to be copied and updated with concurrent reader threads accessing various stale or updated versions of the data structure).

Depending on the status of the flag 210, the first VCPU 171a may execute the read-side critical section operation or exit to the hypervisor 190, to reschedule the read-side critical section operation. In various examples, the first VCPU 171a may exit to the hypervisor 190 via a hypercall or other command to invoke the hypervisor 190.

In various examples, the flag 210 may be a single bit that is set to have a known logical state associated with whether the hypervisor 190 has identified a preempting task (e.g., 0 for a negative status or 1 for a positive status). Accordingly, after the preempting tasks is performed, the status of the single bit flag 210 may be cleared (e.g., set from positive to negative) to allow other read-side critical section operations to be performed safely.

In some examples, the flag 210 may include several bits to act as a counter to identify various numbers of potentially preempting tasks (e.g., an eight-bit counter may indicated between zero and 255 preempting tasks) so that the interrupted or preempted task may be delayed by one or more preempting tasks. Accordingly, as each preempting task is identified, the counter flag 210 is incremented, and as each preempting task is executed, the counter flag 210 is decremented. Once all of the preempting tasks are executed (and the counter flag 210 is set to zero), the read-side critical section operations may be safely performed.

In some examples, the flag 210 may include several bits to act as one or more timers indicating the time (or number of clock cycles) until the preempting task is scheduled to begin or how long the preempting task is expected to take. These time counters may be set by the hypervisor 190 when the preempting task is identified and scheduled, and are decremented as time progresses. When the first VCPU 171a identifies that the read-side critical operation can be performed before the preempting task is scheduled according to the timer if no read options are present, the first VCPU 171a may forbid threads to execute reads and execute the read-side critical section operation. Otherwise, when the preempting task is imminent, the first VCPU 171a may exit to the hypervisor 190 to have the read-side critical section operation be rescheduled outside of the execution timeframe of the preempting task. These timer flags 210 may be used in conjunction with single-bit or multi-bit counter flags 210 or include a zero condition to indicate when no preempting tasks are scheduled. When multiple preempting tasks are identified, the hypervisor 190 may add to a time-to-complete timer flag 210 (e.g., the time to complete all of a first, a second, a third, etc., preempting task) while using the soonest time-to-initiate timer flag 210 (which may be zero if a preempting task is currently being executed) to alert various read-side critical section operations for how long other tasks will have priority.

In some examples, the flag 210 may be a pointer that points to the address of a function handling the status of positive/negative so that the first VPCU 171a jumps to the function address to execute the pointed-to function to determine whether a preempting task is scheduled to interrupt the first VPCU 171a.

The flags 210 may be stored in predefined addresses of the physical or virtual memory to aid in lookup, or the hypervisor 190 may provide a pointer to a variable address in memory that the VCPUs 171 may reference when checking the status of a flag 210 before performing a read-side critical section operations.

Figure 3:
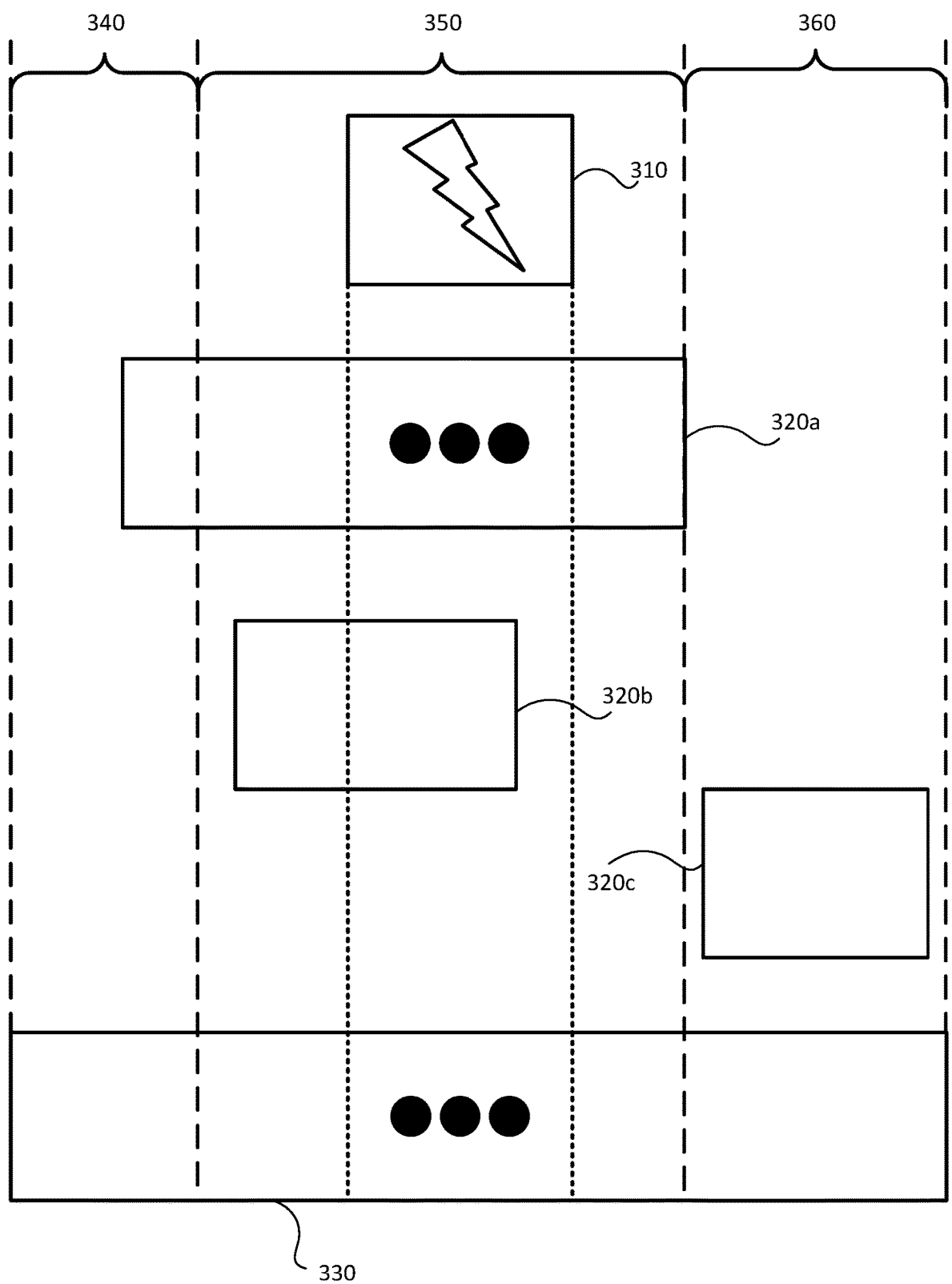
FIG. 3 illustrates a timing layout for safely handling a preempting task with readers performing read-side critical section operations during various phases of an update action performed by an updater, according to examples of the present disclosure.

FIG. 3 illustrates a timing layout for safely handling a preempting task 310 with readers 320a-c (generally or collectively, readers 320) performing read-side critical sections during various phases of an update action performed by an updater 330, according to examples of the present disclosure. As shown, a subscribe-publish mechanism operation, such as RCU, splits an update action into a removal phase 340, a grace period 350, and a reclamation phase 360.

During the removal phase 340, the subscribe-publish mechanism operation removes references to data items within a data structure (possibly by replacing them with references to new versions of these data items) while one or more read-side critical section operations can concurrently read from the data structure. Operations that use the subscribe-publish mechanism allow for the use of a shared data structure so that one thread can update the data structure while other threads can access and read the data structure during the update. The read-side critical section operations that the subscribe-publish mechanism allows for either see the old version or the new version of the data structure, rather than a partially updated data structure.

During the reclamation phase 360, the subscribe-publish mechanism task reclaims or frees the data items removed from the data structure during the removal phase 340. Because removing data items while one or more read-side critical section operations are accessing the data structure can disrupts the readers 320 (e.g., providing an incomplete or incoherent version of the data), the reclamation phase 360 does not begin until all of the readers 320 have stopped accessing the data structure being modified by the updater 330.

Because read tasks initiated during the removal phase 340 cannot be interrupted, and the reclamation phase 360 does not begin until all of the readers 320 have complete the respective read tasks, a grace period 350 exists between the removal phase 340 and the reclamation phase 360, which may extend until all in-process readers 320 have completed.

Each of the readers 320 are threads, and the read-side critical section operations begin with a function that alerts the updater 330 that the reader 320 is entering a read-side critical section operation that cannot be blocked. Similarly, each of read-side critical section operations end with a function that alerts the updater 330 that the reader 320 is no longer referencing the data structure. For example, in the RCU operation, the rcu_read_lock( ) function and the rcu_read_unlock( ) may be used by a reader 320 to indicate the entry to and exit from a read-side critical section operation. The updater 330 (which may be one or more threads for each of the phases) blocks the reclamation phase 360 from starting until all pre-existing read-side critical section operations initiated during the removal phase 340 are complete. In various examples, read-side critical section operations initiated during the grace period 350 or the reclamation phase 360 (such as by the second reader 320b and the third reader 320c) do not affect when the reclamation phase 360 can start as they reference the most recent version of the data structure. In contrast, read-side critical section operations initiated during the removal phase 340 (such as by the first reader 320a) affect when the reclamation phase 360 can start as the reader 320 may reference the updated or the stale version of the data structure.

Accordingly, if a preempting task 310 is performed during the removal phase 340 or the grace period 350, the time to complete any read-side critical section operations that began during the removal phase 340 may be extended for an unknown amount of time; delaying the reclamation phase 360 and holding onto resources to maintain the stale and updated versions of the data structure. Accordingly, when alerting the updater 330 that a reader 320 is entering a read-side critical section operation, the reader 320 first checks the status of the flag 210 to see if a preempting task 310 will interrupt the reader 320. Based on the flag status, the reader 320 may proceed with the read-side critical section or exit to the hypervisor 190, thereby avoiding or mitigating the risk of extending the grace period 350 (and thereby the update action) for an unknown amount of time before the reader 320 is rescheduled.

Figure 4:
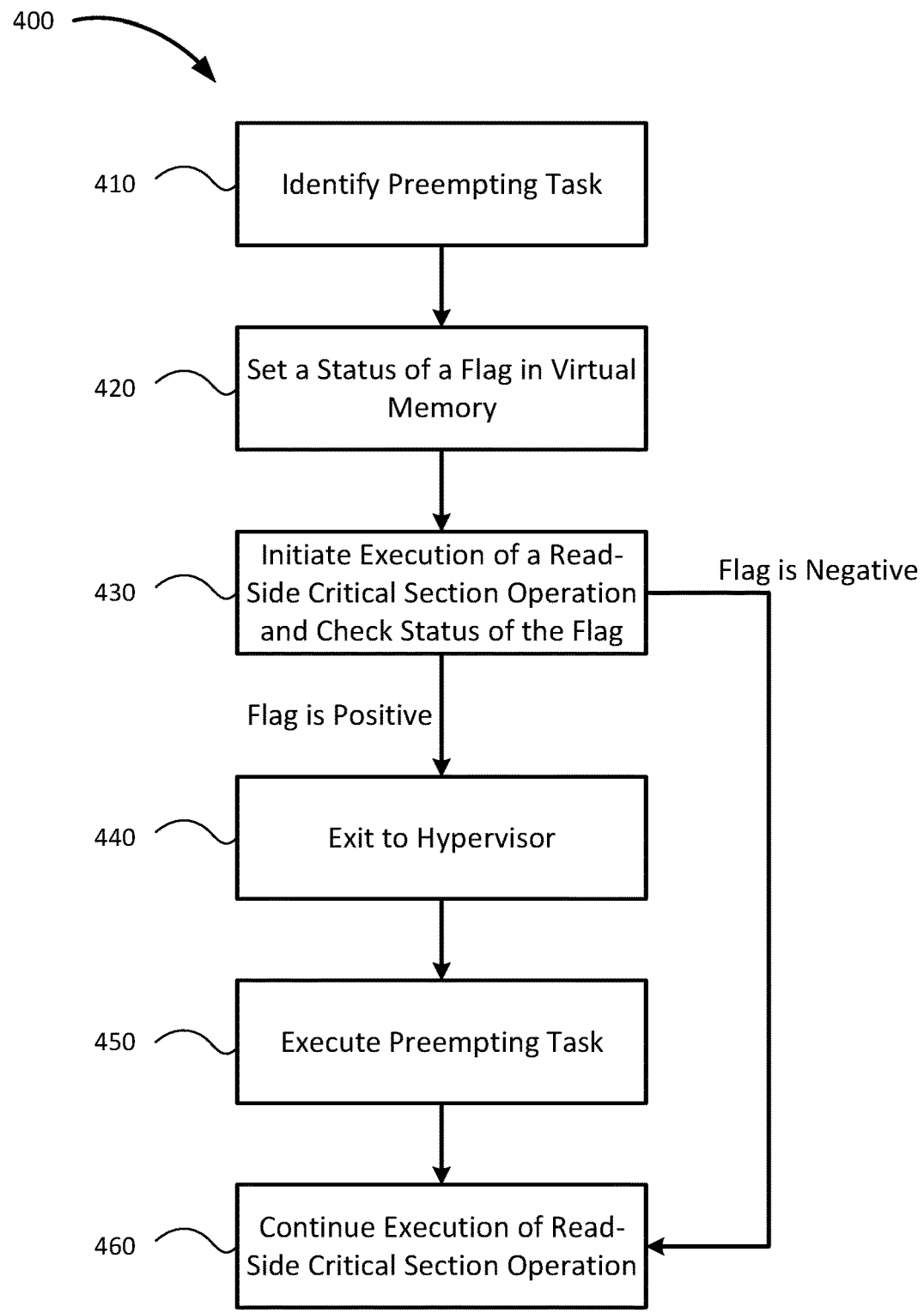
FIG. 4 is a flowchart of a method for the safe handling of critical section operations for virtual machines when virtual central processing unit overcommit is possible, according to examples of the present disclosure.

FIG. 4 is a flowchart of a method 400 for the safe handling of critical section operations for VMs 170 when VCPU-overcommit is possible, according to examples of the present disclosure. Method 400 begins at block 410, where a hypervisor 190 running in the computing system 100 with overcommit enabled for the offered VMs 170 identifies a preempting task to run on a first PCPU 120a that originated from a second PCPU 120b. In various examples, a first VCPU 171a is already assigned to run tasks or threads on the first PCPU 120a, which may be part of the same VM 170 or a different VM 170 than the source (e.g., a second VCPU 171b) of the preempting task. In various examples, the preempting task 310 may be received before or after an update action is received, such as an updater for an RCU operation, and may be received before or after the various reads tasks are received, such as one or more readers 320 that perform read-side critical section operations during an RCU operation.

At block 420, in response to identifying the preempting task (per block 410), the hypervisor 190 sets a status of a flag 210 in a virtual memory 172 used by the first VCPU 171a to indicate the preempting task is scheduled to be performed on the first PCPU 120a. In various examples, the flag 210 may be set setting a state of a designated bit to a value associated with preempting tasks, by incrementing a counter to indicate that an additional preempting task has been scheduled, or by adjusting a timer for when preempting tasks are scheduled to be performed on the first PCPU 120a.

At block 430, a reader scheduled by the first VCPU 171a to run on the first PCPU 120a, initiates execution of a read-side critical section operation by checking the flag status in the virtual memory 172. When the flag status is positive or otherwise indicates that a preempting task is scheduled that will interrupt a read-side critical section operation, method 400 proceeds to block 440. Otherwise, when the status of the flag is negative or otherwise indicates that a preempting task is not scheduled that would interrupt the read-side critical section operation, method 400 proceeds to block 460 to continue executing the read-side critical section operation.

For example, a first read-side critical section operation and a second read-side critical section operation may both be scheduled for execution on a first PCPU 120b during an update operation that the preempting tasks 310 may affect. Depending on when the preempting task 310 is scheduled, when the read-side critical section operations are scheduled, and how long the read-side critical section operations are expected to take, the first read-side critical section operation may proceed to block 440 and the second read-side critical section operation may proceed to block 460. For example, when the second read-side critical section operation is scheduled to begin and conclude before the preempting task 310, to begin after the update operation concludes the removal phase 340, or initiates after the flag 210 has been cleared, the second read-side critical section operation can determine (via the flag 210) that the preempting task 310 is not able to interrupt performance of the read operation, and may therefore proceed to block 460. In contrast, the first read-side critical section operation may check the flag 210 and proceed to block 440 when the flag 210 indicates that the preempting task 310 is imminent and would interrupt the first read-side critical section operation (and thereby extend the grace period 350 and the update operation).

At block 440, in response to the status of the flag 210 indicating that the preempting task is scheduled such that the read-side critical section operation will be interrupted, the reader exits the first VCPU 171a to the hypervisor 190. In various examples, the reader 320, as part of the a rcu_read_lock( ) function or another initial or alerting function for a reader thread, may initiate a hypercall or another command to invoke the hypervisor 190 when the flag 210 indicates a preempting task 310 will interrupt the read-side critical section operation when an updater 330 is in the removal phase 340. In various examples, by rescheduling the reader 320 to perform the read-side critical section operation after the preempting task, the hypervisor schedules the reader 320 to perform the read-side critical section operation after the removal phase 340, and may thereby reduce or shorten the duration of (or remove) the grace period 350 for the updater 330.

At block 450, the hypervisor 190 permits the source of the preempting instruction (e.g., the second VCPU 171b) to execute the preempting task on the first PCPU 120a. In various examples, after the preempting task is complete, the hypervisor 190 resets the status of the flag 210, which may include setting a state of a designated bit to a value associated with no preempting tasks being currently schedule, decrementing a counter for a number of preempting tasks scheduled, or adjusting a timer to indicate that the preempting tasks has been performed.

At block 460, the reader 320 continues execution of the read-side critical section operation. In various examples, the reader 320 continues execution in response to the status of the flag 210 status being negative or otherwise indicating that a preempting event is not scheduled that would interrupt the read-side critical section operation. In some examples, when a preempting task causes the reader 320 to exit to the hypervisor 190, the hypervisor 190 may return the reader to block 460 to continue execution after the first PCPU 120a completes the preempting task, and executes the deferred read-side critical section operation on the first PCPU 120a after the preempting task is complete or outside of the removal phase 340 of the update operation. In some examples, the hypervisor 190 transfers the read operation to a different VCPU 171 within the same VM 170 to be performed on a different PCPU 120 to avoid waiting for the first VCPU 171a to reschedule the read operation.

Figure 5:
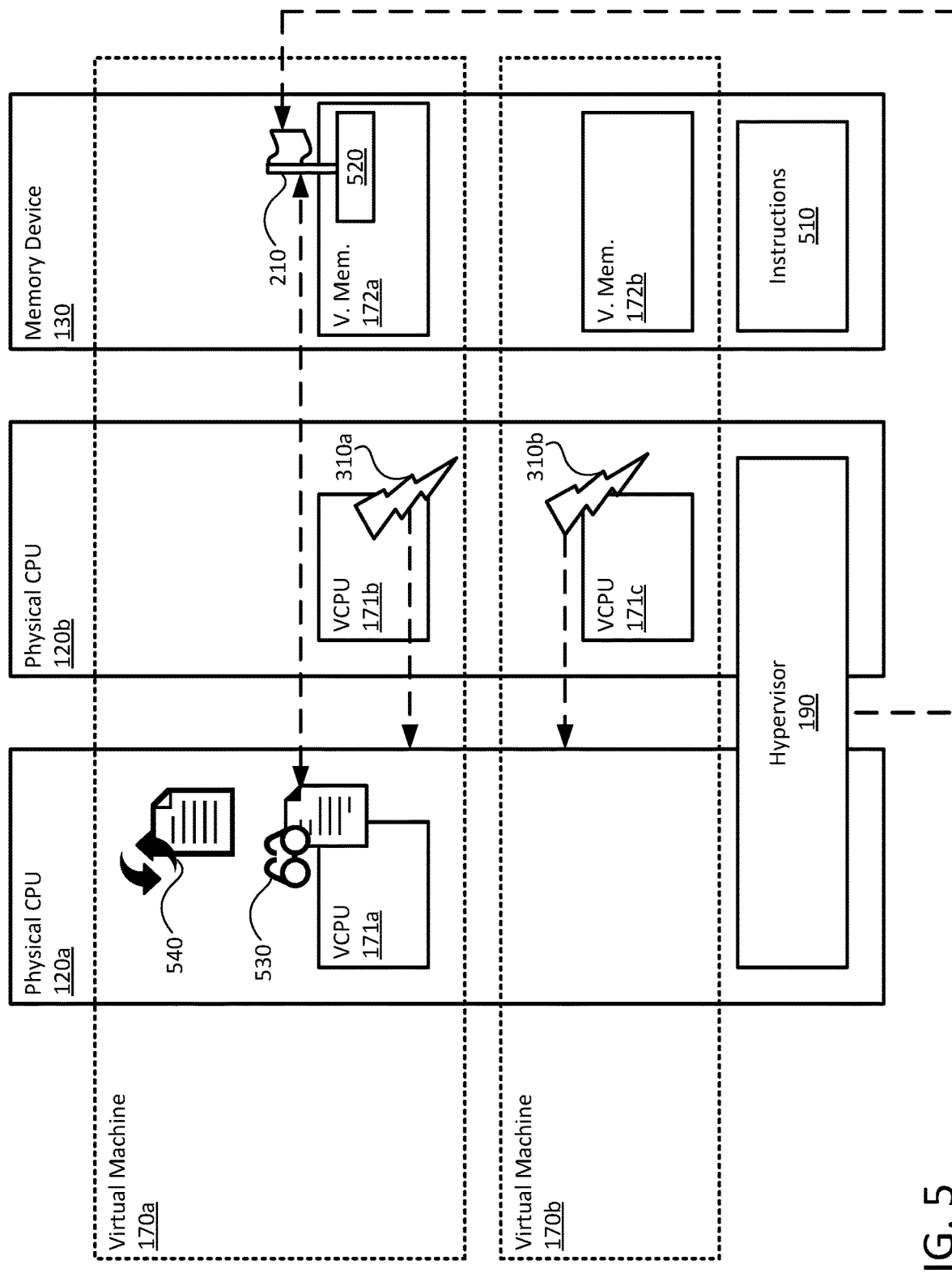
FIG. 5 is a diagram of a system that safely handles critical section operations for virtual machines when virtual central processing unit overcommit is possible, according to examples of the present disclosure.

FIG. 5 is a diagram of a system that safely handles critical section operations for VMs 170 when VCPU-overcommit is possible, according to examples of the present disclosure. The system includes one or more processors (e.g., the PCPUs 120) and memories (e.g., a memory device 130) on which various VMs 170 are provided. When the total number of VCPUs 171 outnumber the total number of PCPUs 120 in the system, the system is said to be in an overcommitted state. Accordingly, a hypervisor 190 (provided by one or more of the PCPUs 120 according to instructions 510 in the memory device 130) may need to identify when tasks from one PCPU 120 can preempt tasks initially scheduled for another PCPU 120 to avoid or reduce the severity or frequency of slowdowns caused on the other PCPU 120.

In the example illustrated in FIG. 5, when a task, such as the first preempting task 310a from the second VCPU 171b (as part of the first VM 170a) or the second preempting task 310b from the third VCPU 171c (as part of the second VM 170b), that originates from a second PCPU 120b is scheduled for execution on a first PCPU 120a, the hypervisor 190 sets a status 520 for the flag 210. The status 520 indicates when the preempting task 310 is imminent, and may (potentially) affect various operations originally scheduled for the first PCPU 120a, such as the read-side critical section operation 530 from the first VCPU 171a (as part of the first VM 170a) during a update task. In various examples, the status 520 may set forth a time when the preempting task 310 is expected to occur, and may automatically expire or be cleared as time progresses. In some examples, the hypervisor 190 sets or increments the status when the preempting task 310 is expected to occur, and resets or decrements the status 520 after the preempting task 310 is complete.

Accordingly, the operations that may be affected by these preempting tasks 310, such as read-side critical section operations 530 that initiate during the removal phase 340 of an update task 540, such as an RCU operation, check the status 520 of the flag 210 before proceeding. When the status 520 gives a positive indication that the preempting task 310 is to be imminently performed on the first PCPU 120a, the first VCPU 171a exits to the hypervisor 190. After which, the hypervisor 190 executes the preempting task 310, and then allows the first VCPU 171a to resume the deferred read-side critical section operation 530. Otherwise, when the status 520 gives a negative indication that a preempting task 310 is to be imminently performed on the first PCPU 120a (i.e., that a preempting task is not imminently scheduled to be performed on the first PCPU 120a), the first VCPU 171a may proceed with the read-side critical section operations 530 as normal.

In various examples, the initial functions of the read-side critical section operations 530 are modified in the kernel to include the check of the flag 210 and potential exit to the hypervisor 190 (e.g., via hypercall) when a preempting task 310 is imminent.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the examples described herein will be apparent to those skilled in the relevant art. Such changes and modifications can be made without departing from the spirit and scope of the present subject matter and without diminishing its intended advantages. It is therefore intended that such changes and modifications be covered by the appended claims.

What is claimed is:

1. A method, comprising:
   in response to identifying a preempting task to run on a first physical central processing unit (PCPU) from a second PCPU, setting, by a hypervisor, a flag in a virtual memory used by a first virtual central processing unit (VCPU) running on the first PCPU to indicate that the preempting task will interrupt the first VCPU;
   after the hypervisor sets the flag, and in response to initiating execution of a read-side critical section operation scheduled by the first VCPU to run on the first PCPU, checking, by the first VCPU, the flag in the virtual memory; and in response to the first VCPU determining that the flag is set:
exiting, by the first VCPU, to the hypervisor;
executing, by the hypervisor, the preempting task on the first PCPU; and
after completing the preempting task, continuing execution, by the first PCPU, of the read-side critical section operation.

2. The method of claim 1, wherein setting the flag involves incorporating information associated with the preempting task into the flag, and further comprising, after completing the preempting task:
removing the information associated with the preempting task from the flag.

3. The method of claim 2, further comprising, after removing the information associated with the preempting task from the flag:
in response to receiving from the first VCPU a second read-side critical section operation, checking whether the flag is set in the virtual memory; and
in response to determining that the flag is unset, executing the second read-side critical section operation.

4. The method of claim 1, wherein the read-side critical section operation is performed during a Read Copy Update (RCU) operation.

5. The method of claim 4, wherein the hypervisor reschedules the read-side critical section operation to execute on the first PCPU outside of a removal phase of the RCU operation.

6. The method of claim 1, wherein the read-side critical section operation is received before the preempting task is received.

7. The method of claim 1, wherein rescheduling the read-side critical section operation shortens a grace period for an update task targeting a shared data structure with the read-side critical section operation.

8. A system, comprising:
a processor; and
a memory including instructions that when executed by the processor perform operations comprising:
in response to identifying a preempting task to run on a first physical central processing unit (PCPU) from a second PCPU, setting, by a hypervisor, a flag in a virtual memory used by a first virtual central processing unit (VCPU) running on the first PCPU to indicate that the preempting task will interrupt the first VCPU;
after the hypervisor sets the flag, and in response to initiating execution of a read-side critical section operation scheduled by the first VCPU to run on the first PCPU, checking, by the VCPU, the flag in the virtual memory; and
in response to the first VCPU determining that the flag is set:
exiting, by the first VCPU, to the hypervisor;
executing, by the hypervisor, the preempting task on the first PCPU; and
after completing the preempting task, continuing execution, by the first PCPU, of the read-side critical section operation.

9. The system of claim 8, wherein setting the flag involves incorporating information associated with the preempting task into the flag, and wherein the operations further comprise, after completing the preempting task:
removing the information associated with the preempting task from the flag.

10. The system of claim 9, wherein the operations further comprise, after removing the information associated with the preempting task from the flag:
in response to receiving from the first VCPU a second read-side critical section operation, checking whether the flag is set in the virtual memory; and
in response to determining that the flag is unset, executing the second read-side critical section operation.

11. The system of claim 8, wherein the read-side critical section operation is performed during a Read Copy Update (RCU) operation.

12. The system of claim 11, wherein the hypervisor reschedules the read-side critical section operation to execute on the first PCPU outside of a removal phase of the RCU operation.

13. The system of claim 8, wherein the read-side critical section operation is received before the preempting task is received.

14. The system of claim 8, wherein rescheduling the read-side critical section operation shortens a grace period for an update task targeting a shared data structure with the read-side critical section operation.

15. A memory device comprising a non-transitory computer-readable medium including instructions that when executed by a processor cause the processor to perform operations comprising:
in response to identifying a preempting task to run on a first physical central processing unit (PCPU) from a second PCPU, setting, by a hypervisor, a flag in a virtual memory used by a first virtual central processing unit (VCPU) running on the first PCPU to indicate that the preempting task will interrupt the first VCPU;
after the hypervisor sets the flag, and in response to initiating execution of a read-side critical section operation scheduled by the first VCPU to run on the first PCPU, checking, by the first VCPU, the flag in the virtual memory; and
in response to the first VCPU determining that the flag is set:
exiting, by the first VCPU, to the hypervisor;
executing, by the hypervisor, the preempting task on the first PCPU; and
after completing the preempting task, continuing execution, by the first PCPU, of the read-side critical section operation.

16. The memory device of claim 15, wherein setting the flag involves incorporating information associated with the preempting task into the flag, and wherein the operations further comprise, after completing the preempting task:
removing the information associated with the preempting task from the flag.

17. The memory device of claim 16, wherein the operations further comprise, after removing the information associated with the preempting task from the flag:
in response to receiving from the first VCPU a second read-side critical section operation, checking whether the flag is set in the virtual memory; and
in response to determining that the flag is unset, executing the second read-side critical section operation.

18. The memory device of claim 15, wherein the read-side critical section operation is performed during a Read Copy Update (RCU) operation.

19. The memory device of claim 18, wherein the hypervisor reschedules the read-side critical section operation to execute on the first PCPU outside of a removal phase of the RCU operation.

20. The memory device of claim 15, wherein the read-side critical section operation is received before the preempting task is received.

* * * * *